July 19, 1938. H. M. GAARDER 2,124,370
INTERIORLY SUPPORTED FILTER PAD
Filed Dec. 13, 1937
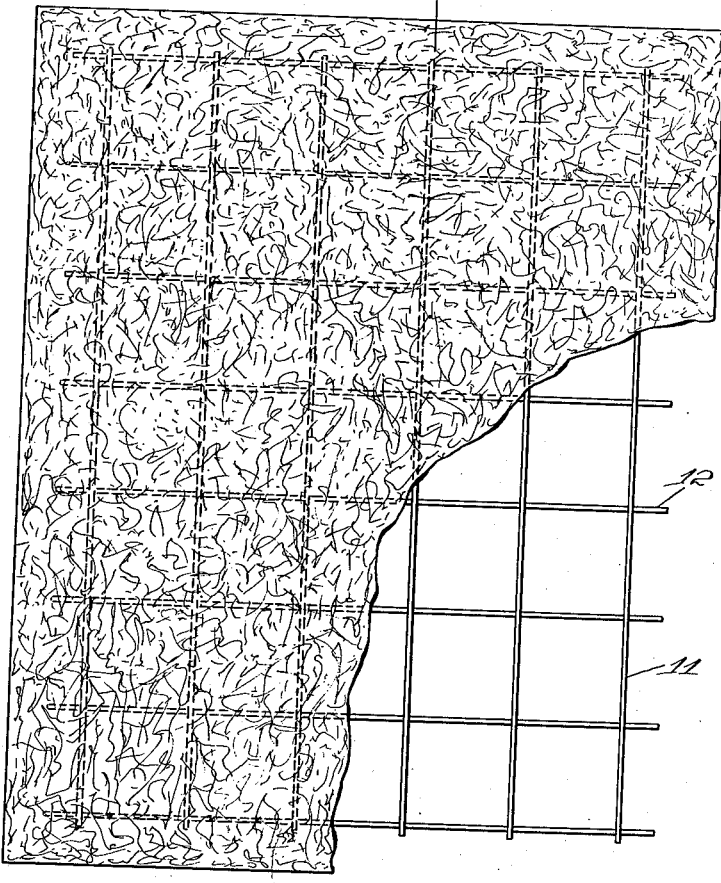
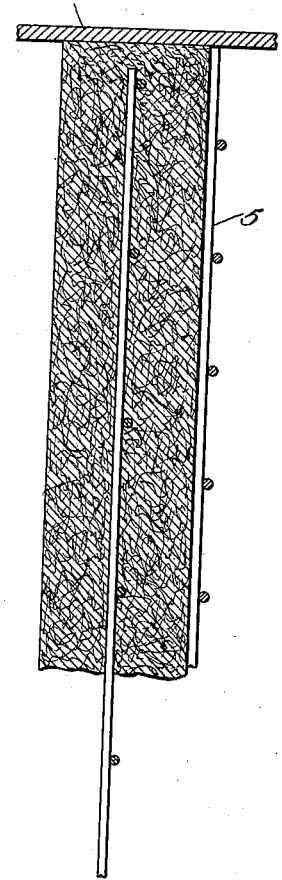
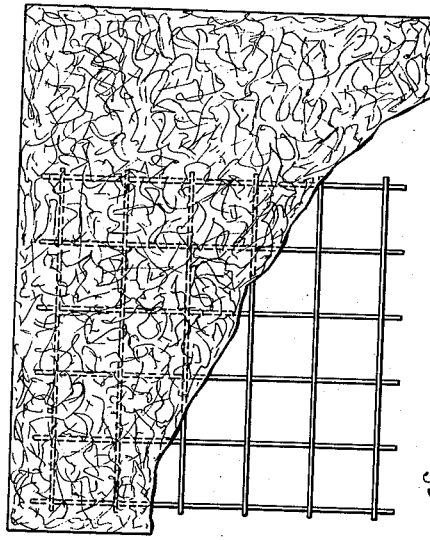
Inventor:
Herbert M. Gaarder
By Chritton, Wiles, Davies, Hirschl & Dawson,
Attys.

Patented July 19, 1938

2,124,370

UNITED STATES PATENT OFFICE 2,124,370

INTERIORLY SUPPORTED FILTER PAD

Herbert M. Gaarder, Chicago, Ill., assignor to Wilson & Co., a corporation of Delaware Application December 13, 1937, Serial No. 179,561

2 Claims. (Cl. 183—49)

This invention relates to an improved air filter pad and more particularly to such a pad prepared of loosely aggregated fibrous material within which is imbedded an open-work metallic screen as a support.

Air filters of the impingement type which remove dirt, dust, pollen and bacteria from gases by impingement, as distinguished from a straining process, have hitherto been customarily prepared and marketed in metal or cardboard containers. These containers are normally of the size of the opening in which the filter is to be employed, and the filtering medium fits inside of them as closely as possible. Such covers are made as open as possible, but still decrease the filtering area about 20% or more, because they cover three-fourths of an inch to an inch at the edges and cover both the face and back of the filter to a considerable degree.

In my co-pending application, Serial No. 102,577 filed September 25, 1936, is described a filter pad in which as a preferred embodiment the loose fibrous material is held between two exterior screens. Such a filter is preferred for general purposes, but for certain other purposes a cheaper filter may be prepared by embedding the metallic screen within the filtering material. Such an embedded support is particularly valuable where the filter is to be employed in a passageway already provided with a screen support against which the filter may rest.

By means of the present invention, as well as the invention set forth in my application Serial No. 102,577, an oversized pad may be readily prepared with resilient filtering edges which compress against the sides of the filter frame and provide a dust-tight filtering seal on all sides.

The invention is illustrated in the drawing in which: Figure 1 is a face view of a filter partially cut away; Figure 2 is a cross-section taken along the line 2 in Figure 1, and also including in section a portion of the filtering passage; and Figure 3 is a face view partially cut away of a modified structure.

As illustrated in the drawing, the filter comprises a mass of fibrous material 10 in which is embedded an open mesh screen 11. The fibrous material extends beyond the edges of the screen, preferably not more than one inch and not less than one-half inch. The ends of the wires may be left protruding as indicated at 12.

It is preferable to employ a screen having as large a mesh as two inches for normal sized filters. The wires are of small size and may be welded at the joints if desired. A 14-gauge galvanized iron wire frame is satisfactory with the elements spaced approximately two inches apart.

As an example of the invention, an air filter was produced by filling a square mold 20½" on edge and approximately 2" in thickness with approximately 7 to 8 ounces of hair. The hair is preferably hog hair which may include minor proportions of uncurled hog hair, say, 7 to 25%. It may also include up to 10% of long hair such as cattle hair, horse tail hair, or horse mane hair. The uncurled hair may be either intermixed with curled hair, or may be evenly distributed on one face of the filter, for example, the air exit face. The hair should be fluffed in order to provide proper density ratios, which should ordinarily be within the range of one-half to one and one-half ounces of hair per 100 cubic inches of pad, and preferably three-fourths to one and one-fourth ounce. A thin pad, of course, is preferably more dense than a thick one, and with shorter hair the density ranges may be somewhat higher.

In preparing the pad approximately one half of the hair is dropped into the mold in fluffed condition, the screen is then dipped in adhesive and laid on top of the hair and the remaining hair placed upon it. The use of the adhesive upon the screen is of considerable value in preventing separation of the hair about the screen. A preferred adhesive is latex.

After the screen has thus been embedded, the loosely formed pad is then treated exteriorly with an adhesive to bind the outer hairs firmly together and provide an outer shell. This is preferably done by spraying the formed pad with the adhesive.

With a filter pad 20½" square, a satisfactory screen is one 19½" square, measured from the points of the wires, or, say, 18½" square from the cross wires. With screens of lighter mesh, however, slightly less wide borders are preferred and the screen may well have its cross wires extend within ½" from the edge of the pad. In such an event, however, the wires should be clipped off at the last cross wire.

When placed in a passageway 20" square, the screen compresses to the size of the opening, but owing to the resilience of the hair, the take-up is transmitted several inches into the interior of the pad, the portion of the pad so affected is not appreciably denser and maintains its original filtering efficiency. This is illustrated in Fig. 2, where the pad is shown with its upper edge contacting a wall 14 of a passageway. The filter pad is also shown as resting against a screen 5 affixed to the walls of the passage.

In Figure 3 is shown a somewhat modified form of filter in which the support is embedded unsymmetrically near the bottom of the pad. It has been discovered that where the pad is to be used in an upright position the upper portion of the pad needs less reinforcement than the lower, and it is possible to utilize the screen in the form shown in Fig. 3. In a specific example of such a pad, the margin of the screen to the edge of the pad is ½" to 1" on all edges except the top where it is 4" to 4½", the whole pad again being approximately 20½" square. In this case the pad is always placed with the wider margin at the top.

While the filter has been described as of hair, other similar fibrous material, and particularly naturally or artificially resilient fibrous material, may be employed. Likewise, narrow mesh screen may be employed, but cuts down the efficiency of the pad by increasing its resistance. In no event should the filter be of a smaller mesh than a ¼" opening, although, of course, if very strong and very fine wires were employed, equivalent low resistance might be obtained with smaller meshes. Metal lath may be employed as a screen. Before use, one face of the screen is sprayed or coated with oil.

This application is a continuation-in-part of my co-pending application Serial No. 102,577 filed September 25, 1936.

The foregoing detailed description has been given for clearness of understanding only and no unnecessary limitations should be understood therefrom, but the appended claims should be construed as broadly as permissible, in view of the prior art.

I claim:

1. An air filter pad adapted to fit an opening in an air passageway, comprising a pad of loosely distributed interconnected resilient fibrous filtering material, a coarse mesh screen support embedded in the pad and glued to adjacent fibers, the screen being of substantially smaller area than the pad, but having a size sufficient to support the pad in operating position.

2. An air filter pad adapted to fit an opening in an air passageway comprising a pad of loosely distributed resilient fibrous material, a coarse mesh screen support centrally embedded in the pad and secured to fibers touching it, the screen being of substantially smaller area than the pad.

HERBERT M. GAARDER.